(12) United States Patent
Watanabe et al.

(10) Patent No.: US 7,453,359 B2
(45) Date of Patent: Nov. 18, 2008

(54) IC TAG COMMUNICATION RELAY DEVICE, IC TAG COMMUNICATION RELAY METHOD

(75) Inventors: Toshio Watanabe, Minamiashigara (JP); Hiroyuki Yamauchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 430 days.

(21) Appl. No.: 11/000,206

(22) Filed: Dec. 1, 2004

(65) Prior Publication Data
US 2005/0264422 A1    Dec. 1, 2005

(30) Foreign Application Priority Data
May 31, 2004    (JP)    ............................. 2004-162298

(51) Int. Cl.
*G08B 13/14*    (2006.01)
(52) U.S. Cl. ................ 340/572.1; 340/5.92; 340/572.7; 343/866; 343/878
(58) Field of Classification Search ................ 340/5.92, 340/10.1, 10.51, 505, 572.1, 527.7; 705/28; 455/7; 343/741, 866, 878
See application file for complete search history.

(56) References Cited

U.S. PATENT DOCUMENTS

| | | | |
|---|---|---|---|
| 6,335,686 B1 * | 1/2002 | Goff et al. ................ | 340/572.7 |
| 6,538,564 B1 | 3/2003 | Cole | |
| 6,563,425 B2 * | 5/2003 | Nicholson et al. ........ | 340/572.7 |
| 6,595,418 B1 * | 7/2003 | Igarashi et al. ............. | 235/385 |
| 6,714,121 B1 * | 3/2004 | Moore ........................ | 340/10.3 |
| 7,091,859 B2 * | 8/2006 | Duron et al. ............. | 340/572.1 |
| 2002/0130817 A1 * | 9/2002 | Forster et al. ............... | 343/770 |

FOREIGN PATENT DOCUMENTS

| | | |
|---|---|---|
| JP | 2001-22905 | 1/2001 |
| JP | 2002-240913 | 8/2002 |

\* cited by examiner

*Primary Examiner*—Thomas J Mullen
(74) *Attorney, Agent, or Firm*—Morgan Lewis & Bockius LLP

(57) ABSTRACT

An IC tag communication relay device is provided with an antenna section, lead lines and input/output unit. The antenna section is equipped with one or more antennas for transmitting and receiving electromagnetic radiation to and from IC tags. The lead lines are connected to each antenna for transmitting electrical signals corresponding to transmitted and received electromagnetic radiation. The input/output unit is arranged outside of the antenna corresponding to each antenna connected to the lead lines.

20 Claims, 15 Drawing Sheets

IC TAG COMMUNICATION RELAY DEVICE, IC TAG COMMUNICATION RELAY METHOD

BACKGROUND OF THE INVENTION

1. Field of the Invention

The present invention relates to technology for carrying out communication with IC tags, and particularly relates to technology that can be used in situations where direct radio wave communication with IC tags is difficult.

2. Description of the Related Art

IC tags (RFID tags) equipped with antennas and integrated circuits (ICs) were first utilized through fitting to various products or packaging etc. Manufacturing information etc. and distribution information is written to these IC tags in the manufacturing stage. This is then utilized, for example, in distribution traceability, stock management and destination designation etc. in the distribution stage. In the distribution stage, each item of merchandise is frequently packed into individual boxes and loaded on a pallet, and then transported and packed in pallet units.

Japanese Patent laid-open publication No. 2002-240913 discloses that relating to distribution management technology employing pallets.

For example, IC tags are typically fitted to process cartridges for copiers and printers employing electronic transfer methods. Manufacturing information such as manufacturing number and manufacturing year/month/day etc. is stored in the IC tag and utilized at the time of installation in a copier or printer. Further, it is also possible to store distribution information such as destination and day and time of shipping in the IC tag for utilization in distribution management.

However, a large number of metallic members such as an axial core shaft of an electrostatic roll or photosensitive drums based on aluminum are incorporated in this process cartridge. Because of this, when individually boxed process cartridges are mounted on a pallet in large numbers, the metallic members constituting conductors act to shield electromagnetic radiation. This makes it very difficult to access the IC tags within the individual packages using electromagnetic radiation. In the current situation, in the distribution process, an operation is carried out where each individual package is temporarily unloaded from the pallet during communication with the IC tags, read-write processing is carried out individually, and the packages are then loaded on the pallet again.

SUMMARY OF THE INVENTION

An IC tag communication relay device comprising: an antenna section equipped with one or more antennas for transmitting and receiving electromagnetic radiation to and from IC tags; lead lines connected to each antenna for transmitting electrical signals corresponding to transmitted and received electromagnetic radiation; and an input/output unit arranged outside of the antenna section for inputting and outputting electrical signals corresponding to each antenna connected to the lead lines.

An IC tag is a small device equipped with an integrated circuit (IC) and an attached antenna connected to the integrated circuit. These are also referred to as RFID tags. At the IC tag, electromagnetic radiation is transmitted and received using the attached antenna, and information stored in the integrated circuit is read out and written in. The opposing party communicating with the IC tag consists of external equipment such as a reader/writer. An IC tag communication relay device is provided between the IC tag and the external device and relaying of this communication is carried out.

The antenna section is provided with one or more antennas for transmitting and receiving electromagnetic radiation to and from the IC tag. It is typical to use only one antenna at the same time during transmission but it is also possible to use two or more antennas at the same time. The lead lines are connected to the antennas and electrical signals corresponding to the electromagnetic radiation are transmitted. The lead lines are connected to the input/output section arranged outside of the antenna section. As a result, the input/output unit is capable of inputting and outputting electrical signals corresponding to each antenna to and from external equipment. Inputting and outputting to and from the external equipment may be carried out using a wired system or wireless system.

According to this configuration, in cases where the IC tags are surrounded by metal etc. so that it is difficult for the external device to carry out direct communication using electromagnetic radiation, it is possible to carry out communication by arranging the IC tag relay device so that such barrier sections are overcome. The communication distance can then be changed by adjusting the distance between the antenna section and the input/output section.

By employing this IC tag communication relay device, it is possible to implement an IC tag communication relay method for communicating with the IC tags fitted to small boxes, of the small boxes loaded on the pallet, that do not have surfaces exposed to the outside when loading is complete.

BRIEF DESCRIPTION OF THE DRAWINGS

Preferred embodiments of the present invention will be described in detail based on the following figures, wherein.

DETAILED DESCRIPTION OF THE INVENTION

Figure 1:
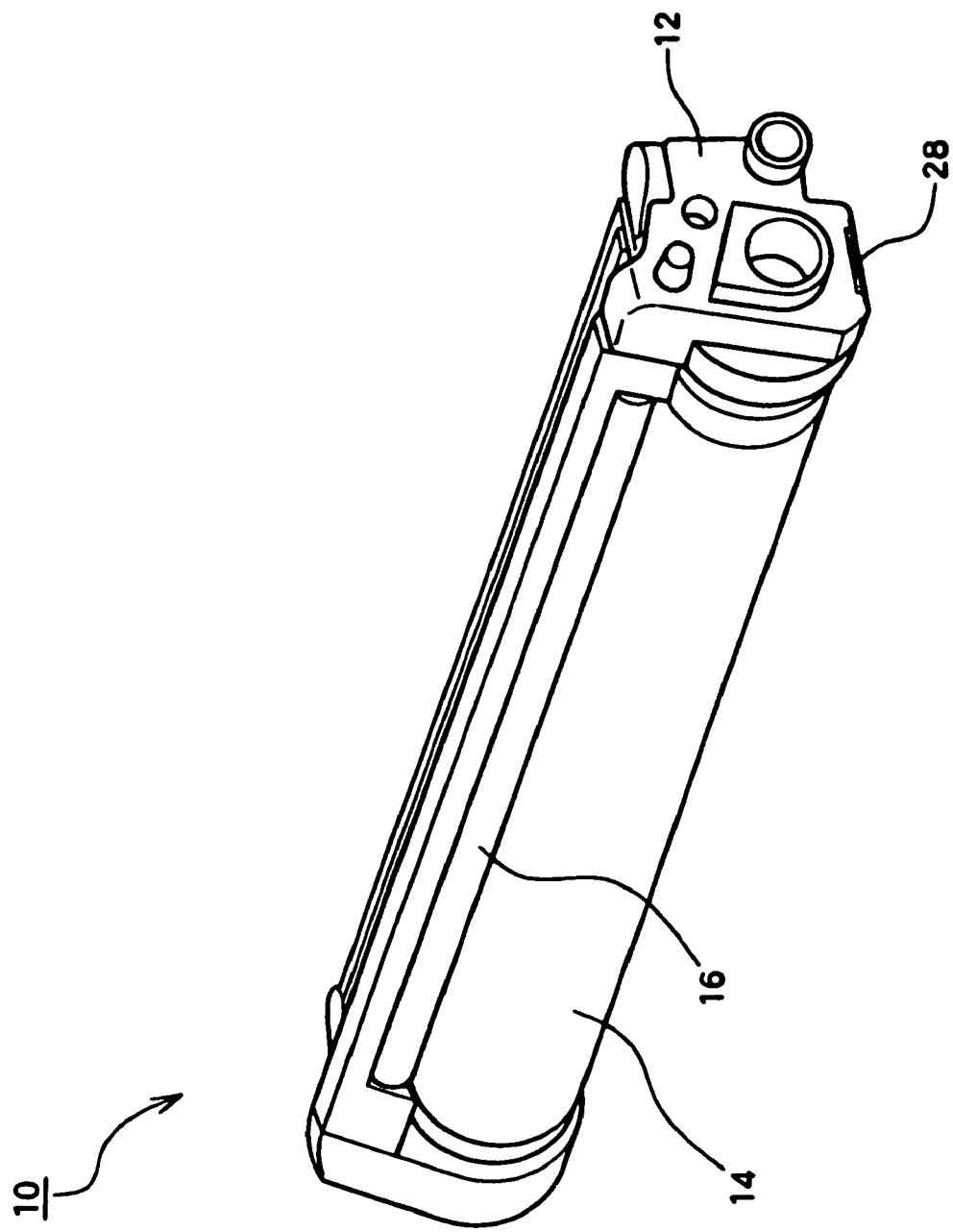
FIG. 1 is a perspective view of a process cartridge equipped with an IC tag.
Figure 2:
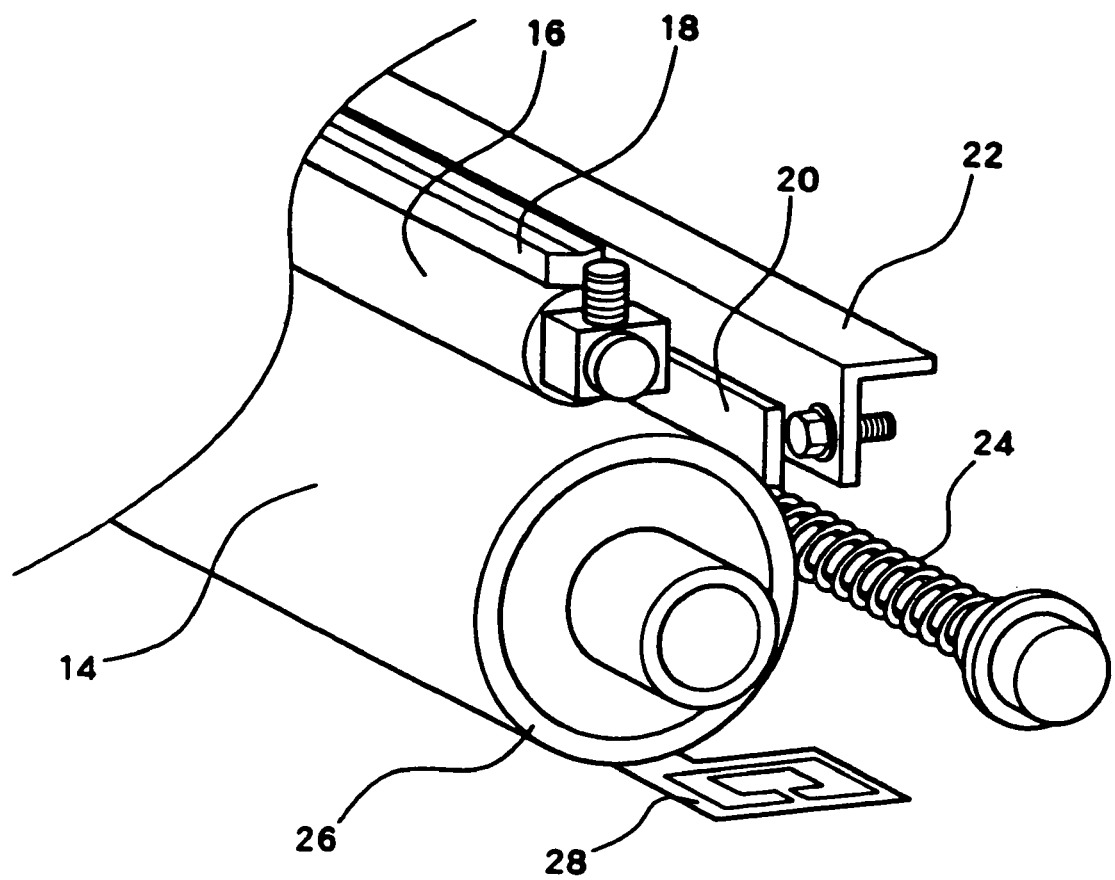
FIG. 2 is a partially enlarged view of the process cartridge of FIG. 1.

FIG. 1 is a perspective view of a process cartridge 10 used in electro photographic copiers and printers. Further, FIG. 2 is an enlarged view of this process cartridge 10, and shows a situation with the cover 12 etc. of the process cartridge 10 removed.

The process cartridge 10 is a replaceable member bearing the load of processing relating to a printed image forming process, and is used through installation in copiers and printers. To provide a configuration for this purpose, the process cartridge 10 is equipped with a photosensitive drum 14. The photosensitive drum 14 is a member formed with a toner image on its surface. An electrostatic roll 16 for uniformly electrifying the photosensitive drum 14 and a cleaning member 18 for cleaning the electrostatic roll 16 are provided at the upper part of the photosensitive drum 14. Further, a cleaning blade 20 for physically eliminating toner at the surface of the photosensitive drum 14 and a blade support plate 22 for supporting this cleaning blade 20 are provided at a side surface of the back side of the photosensitive drum 14. The removed toner is then discharged by a toner discharging screw provided at the bottom of the cleaning blade 20. A drum flange 26 is provided at an end of the photosensitive drum 14 with an IC tag 28 being arranged below.

In a process of carrying out image forming processing at the copier and printer, the photosensitive drum 14 is rotated counterclockwise as shown in the drawings. First, the surface is subjected to electrostatic processing by being uniformly electrostatically charged by the electrostatic roll 16. This is then subjected to laser irradiation by laser beam exposure means (not shown) and an electrostatic latent image is formed on the surface. This electrostatic latent image is changed to a toner image as a result of development processing performed by a development device (not shown) using the toner. The toner image formed in this fashion is transferred to paper by a transfer device (not shown) so that a printed image is formed on the paper as a result. Residual toner remaining on the surface of the photosensitive drum 14 that is not transferred in the transfer process is then scraped away by the cleaning plate 20. The electrostatic roll 16 then once again carries out electrostatic processing with respect to the cleaned photosensitive drum 14 and the next image is made.

The process cartridge 10 is made mainly of metal constituting a semiconductor. For example, the photosensitive drum 14 is made of aluminum. Further, the electrostatic roll 16 is formed so that a stainless steel shaft is covered by conductive rubber. The cleaning blade 20 is made of urethane rubber, and the blade support plate 22 is made of steel.

This process cartridge 10 is housed in an individual box constituted by a small cardboard box protected by shock-absorbing material such as expanded polystyrene (EPS). The size of the box differs depending on the type, but in the case of a monochrome-type capable of processing paper that is, for example, A4-size, this size is a width of 450 mm, depth of 250 mm and height of 200 mm.

The individual boxes are then loaded on a wooden or plastic pallet. As shown in JIS (Japanese Industrial Standard) Z-0105, the loading state of the pallet is carried out using various patterns according to the relative dimensions of the pallet and the individual boxes. In the case of individual boxes for process cartridges as shown here, on the order of 20 to 100 boxes of a typical size (width, 1100 mm, depth 1100 mm) can be loaded.

Figure 3:
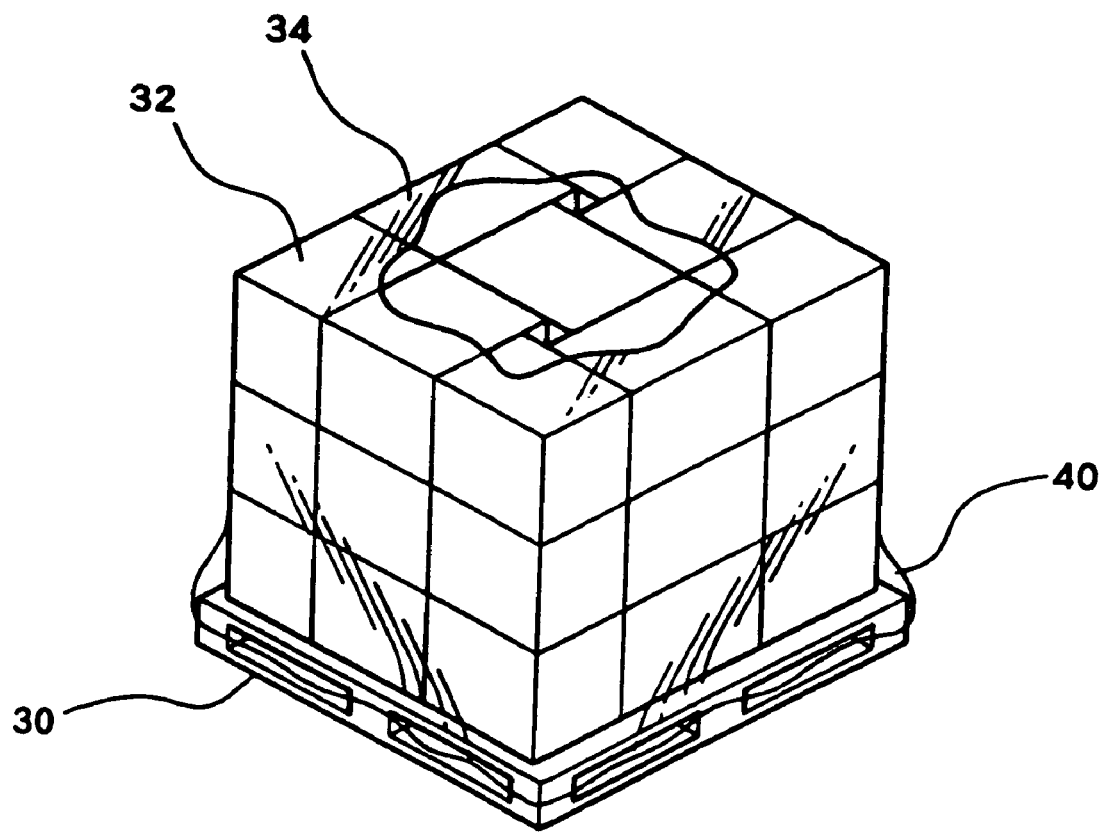
FIG. 3 is a perspective view showing a situation where individual boxes are loaded on a pallet.

FIG. 3 is a schematic perspective view showing a situation where individual boxes are loaded on a pallet. The individual boxes 32, 34, . . . are loaded on the pallet 30 using a square pinwheel course pattern method that maintains a gap on the inside where there are 3×3 boxes at each tier and the boxes are piled three-high to give a total of 27 boxes. This is then covered all around with a stretch film 40 that is wrapped around to prevent tumbling.

Communication can then typically be carried out with each of the IC tags on the individual boxes 32, 34, . . . loaded on the pallet using a reader/writer. However, it is not straightforward to carry out communication with IC tags of individual boxes of the plural boxes 32, 34, . . . with outer surfaces that cannot be seen. This is because electromagnetic radiation is shielded by metal contained in the process cartridge 10 in the surrounding individual boxes. In the example in FIG. 3, there is a tendency, depending on the case, for communication with the IC tag of the individual box at the center of the bottom tier of the individual boxes in the central tier to be particularly difficult.

This problem can be resolved by introducing an IC tag communication relay device. In the following, a description is given using FIG. 4A to FIG. 9 of the case of using an IC tag communication relay sheet constituting a sheet-shaped IC tag communication relay device and a description is given using FIG. 10A to FIG. 15 of the case of using an IC tag communication relay bar constituting a bar-shaped IC tag communication relay device.

Figure 4A:
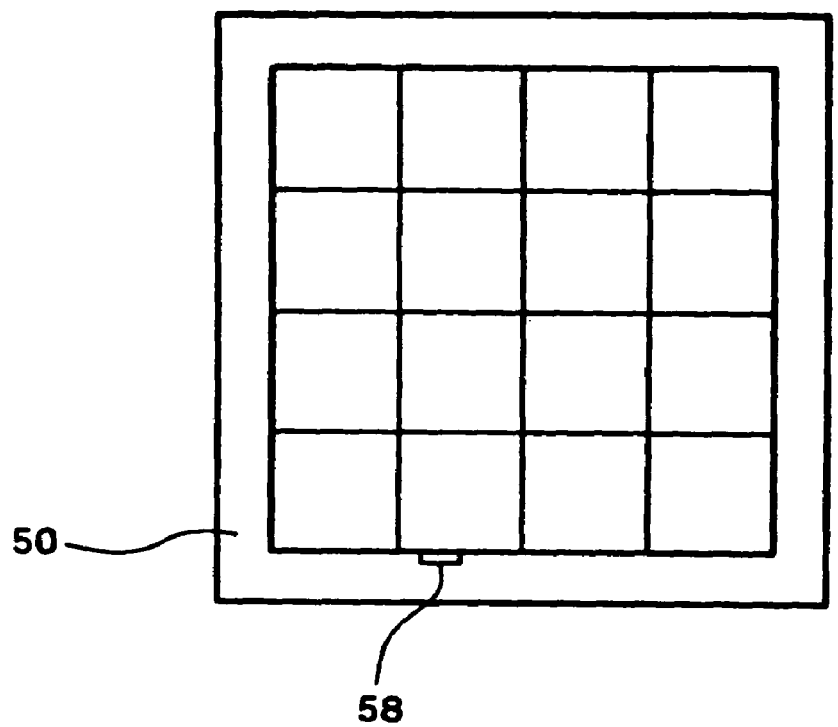
FIG. 4A is a plan view of a loading example employing an IC tag communication relay sheet.
Figure 4B:
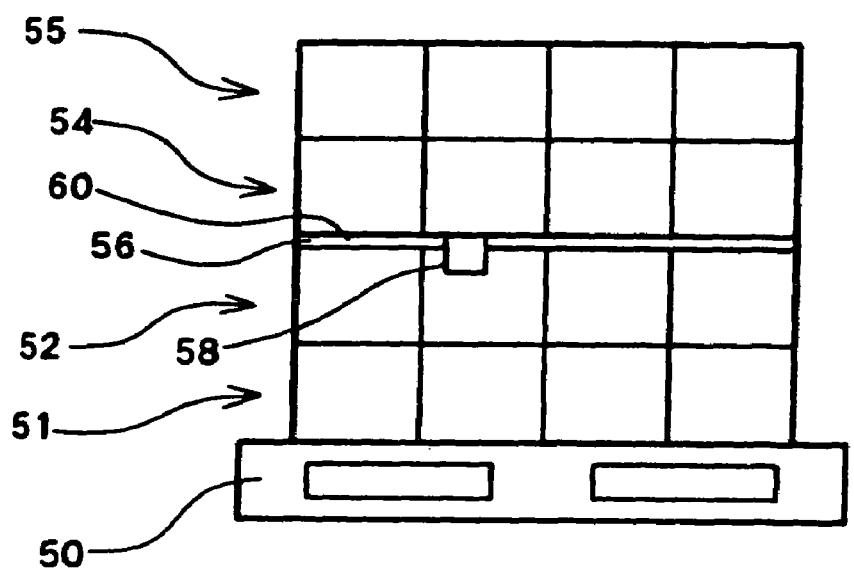
FIG. 4B is a front view of the loading example shown in FIG. 4A.

FIG. 4A is a view from above and FIG. 4B is a front view showing the situation when loading individual boxes on a pallet. Here, a total of sixty-four cuboid individual boxes are loaded on the pallet 50 four in a cross-wise direction, four in a depth direction, and four in a height direction without gaps therebetween. Because of this, usually, communication with IC tags of the 2×2 individual boxes at the center at the second tier 52 and third tier 54 from the bottom is difficult. A sheet-shaped member 60 of an IC tag communication relay sheet 56 is therefore sandwiched between the second tier 52 and the third tier 54. A plate-shaped member 58 forming part of the IC tag communication relay sheet 56 therefore hangs down at the outer side of the individual boxes of the third tier 54.

Figure 5:
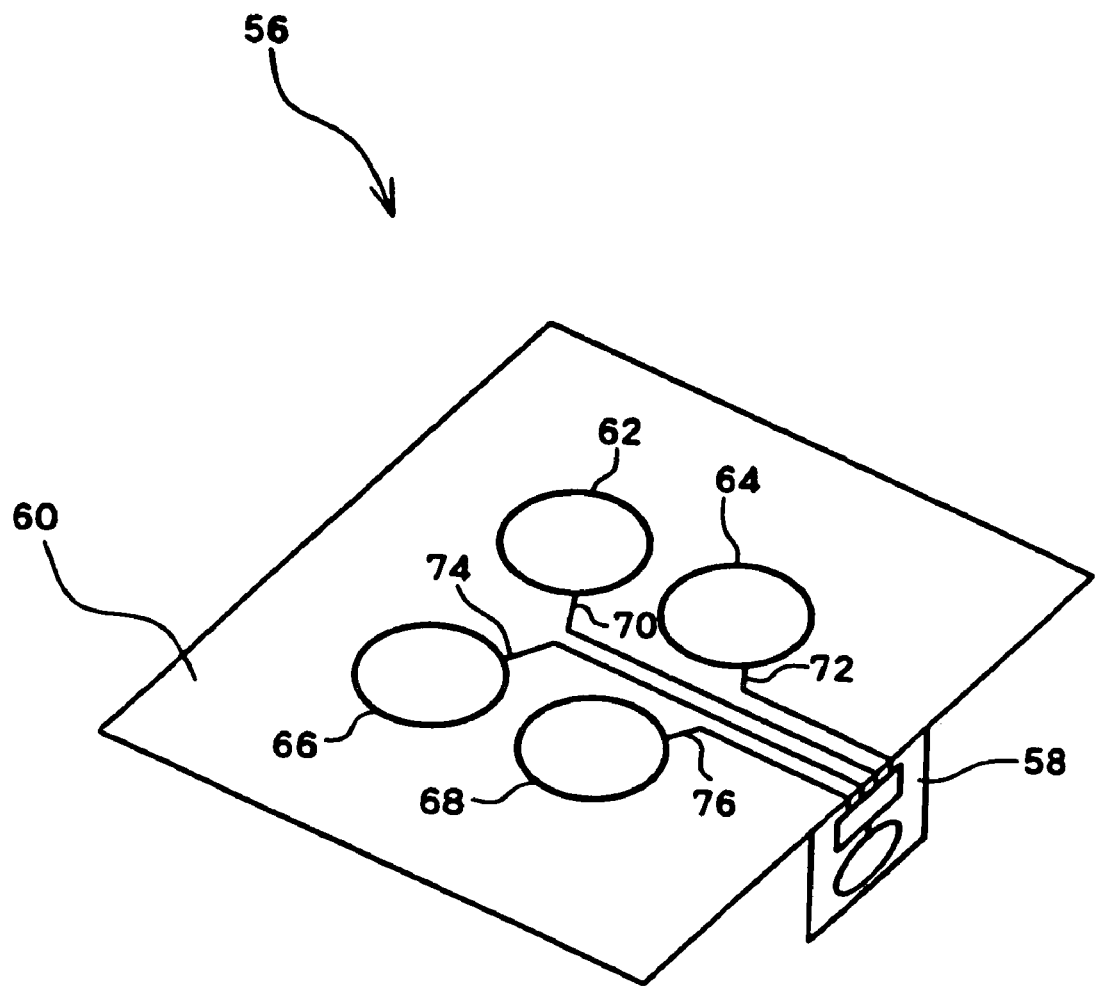
FIG. 5 is a view showing an example of an IC tag communication relay sheet.

FIG. 5 is a perspective view of the IC tag communication relay sheet 56. The IC tag communication relay sheet 56 is comprised of a sheet-shaped member 60 constituted by a flexible square of resin, and a plate-shaped member 58 connected facing downwards so as to be orthogonal to the sheet-shaped member 60 at an edge of one side of the sheet-shaped member 60. The vicinity of the center of the sheet-shaped member 60 constitutes an antenna section, with four loop antennas 62, 64, 66, 68 being formed so as to be arrayed 2×2. Lead lines 70, 72, 74, 76 extending from the plate-shaped member 58 are then connected to the loop antennas 62, 64, 66, 68 respectively. (Typically, a lead line for a loop antenna is composed of a pair of lines but this is omitted from the drawings).

Figure 6:
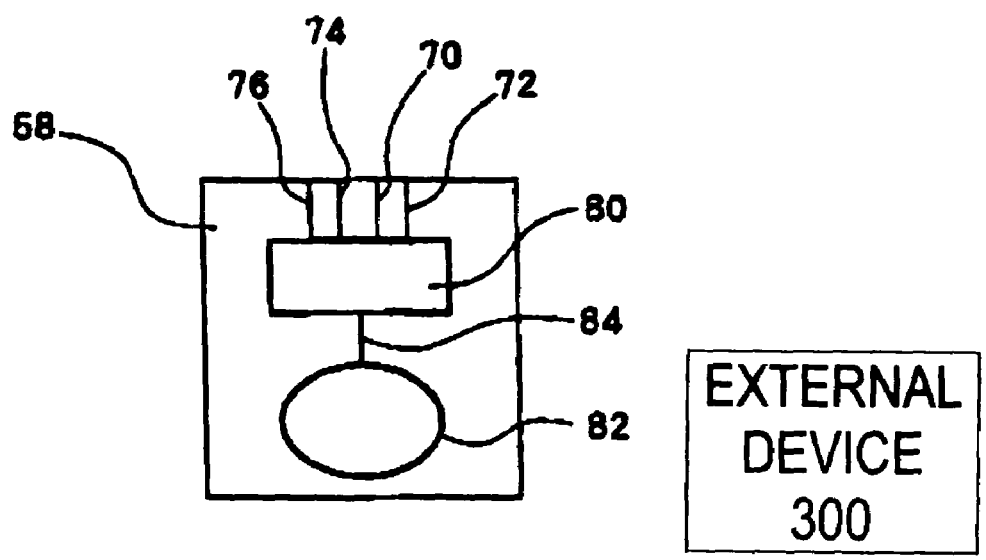
FIG. 6 is a view showing the vicinity of input/output sections of an IC tag communication relay sheet.

FIG. 6 is a view illustrating the plate-shaped member 58 in an enlarged manner. The plate-shaped member 58 is made of resin, and includes a relay 80 and a hub antenna 82 taken as an input/output unit. Lead lines 70, 72, 74 and 76 are connected to the relay 80. The relay 80 and the hub antenna 82 are connected using a lead line 84.

The relay 80 is provided to connect the hub antenna 82 and the loop antennas 62, 64, 66 and 68 together. For example, the relay 80 bears the responsibility of carrying out impedance matching between the hub antenna 82 and the loop antennas 62, 64, 66 and 68 so as to ensure that electrical signals are transmitted smoothly. A switching circuit is provided at the relay 80. The switching circuit is provided for switching the loop antennas 62, 64, 66, 68 connected to the hub antenna 82 based on instructions from the hub antenna 82. The switching of the switching circuit is carried out based on instruction signals sent from the reader/writer (an external device 300 in FIG. 6) via the hub antenna 82. As a result, for example, switching processing is carried out in such a manner that electromagnetic radiation is not emitted from the plural loop antennas 62, 64, 66, 68 at the same time, and mutual interference of electromagnetic waves can therefore be prevented.

According to this configuration, it is possible for a user to access IC tags within individual boxes loaded on the pallet via any one of the loop antennas 62, 64, 66 and 68 by transmitting and receiving electromagnetic radiation to and from the hub antenna 82 using the reader/writer. With this configuration, electrical power used in the operation of the relay 80 utilizes electromagnetic energy received by the hub antenna 82.

Figure 7:
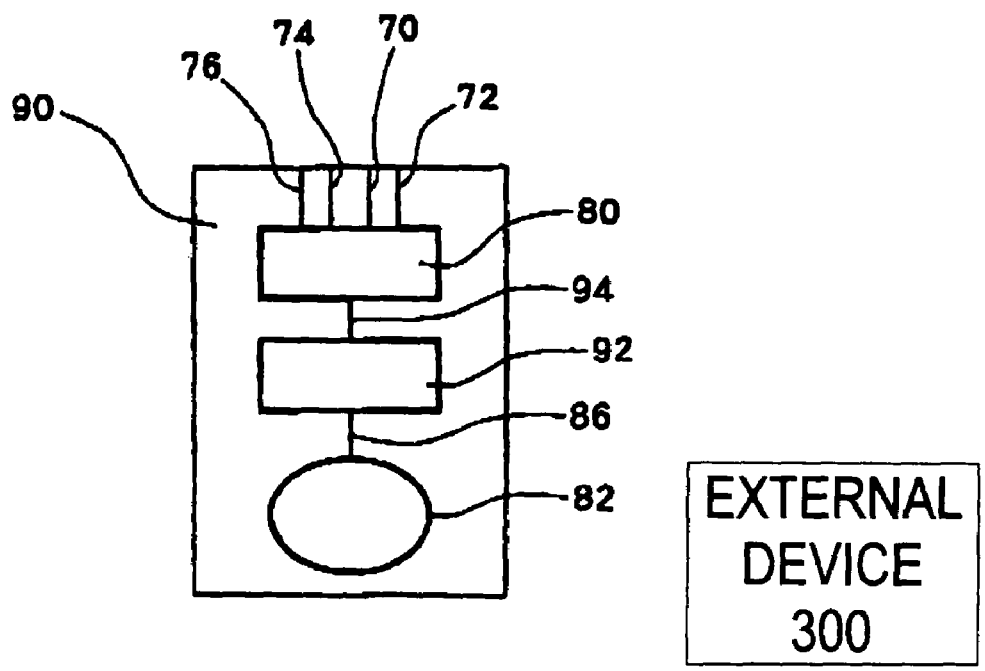
FIG. 7 is a view showing a modified example of a configuration for the vicinity of an input/output section.

FIG. 7 is a view illustrating an embodiment of a plate-shaped member 90 constructed separately from that of FIG. 6. Elements of the configuration that are the same are given the same numerals and description thereof is omitted. The characteristic of the plate-shaped member 90 is that a relay amplifier 92 is provided with a built-in battery between the relay 80 and the hub antenna 82. Namely, electrical signals transmitted by the lead line 96 received by the hub antenna 82 are amplified by the relay amplifier 92 and sent to the relay 80 via the lead line 94. As a result, it is possible to increase the output of electromagnetic radiation generated in the direction of the IC tags from the loop antennas 62, 64, 66 and 68. It is therefore possible to reduce the strength of electromagnetic radiation emitted towards the hub antenna 82 from the reader/writer (an external device 300 in FIG. 7).

Electrical signals sent from the loop antennas 62, 64, 66, 68 based on electromagnetic radiation received from the IC tags is amplified by the relay amplifier 92 and is sent to the hub antenna 82. As a result, it is possible to send electromagnetic radiation of a sufficient strength to the reader/writer even when electromagnetic radiation from the IC tags is weak.

It is also possible to provide a frequency conversion function as necessary. Namely, by changing the communication frequency between the reader/writer and the hub antenna 82 and the communication frequency between the loop antennas 62, 64, 66, 68 and the IC tags, it is possible to prevent interference of electromagnetic radiation and it is possible to adjust the possible communication distance.

Further, it is also possible for wired communication to take place between the hub antenna 82 and the reader/writer rather than wireless communication. In the case of wireless communication, it is possible for the stretch film 40 (of FIG. 3) to connect with the hub antenna 82 of FIGS. 6-7 without any problem. In the case of a wired connection, for example, a direct connection where the tip of the connection part of the reader/writer forms a piercing shape and pierces the stretch film 40 is possible and straightforward.

Figure 8:
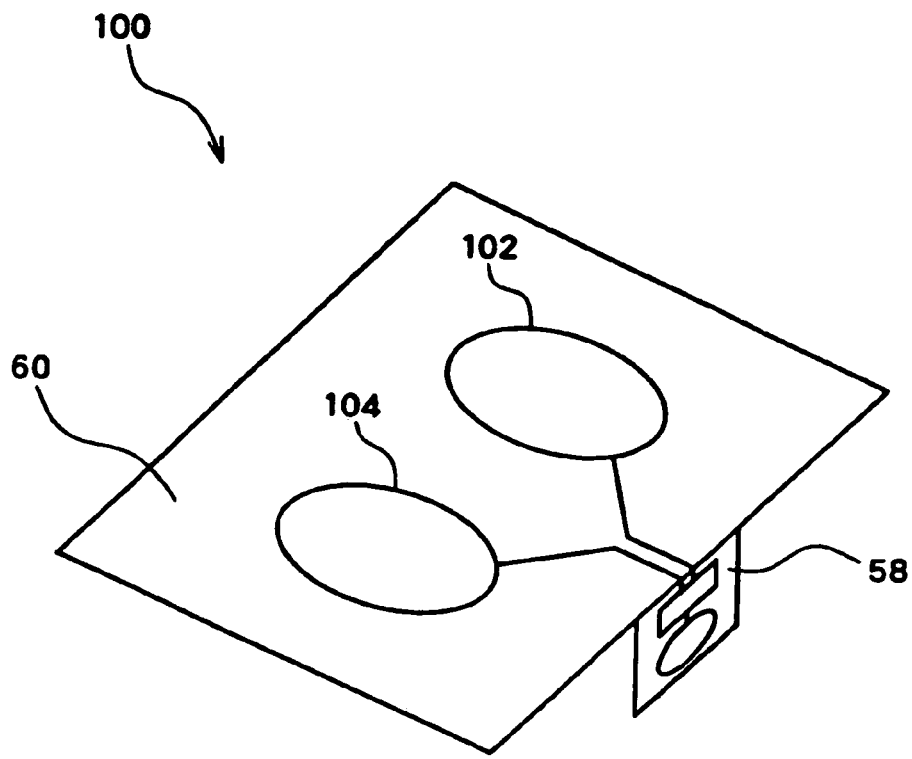
FIG. 8 is a view showing a further example of an IC tag communication relay sheet.
Figure 9:
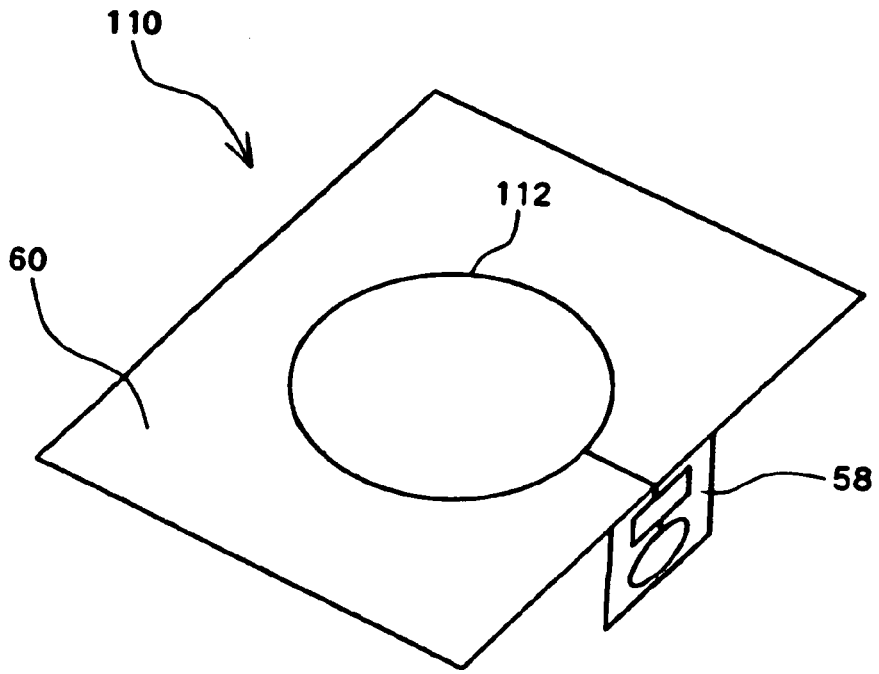
FIG. 9 is a view showing a still further example of an IC tag communication relay sheet.

FIG. 8 and FIG. 9 are schematic perspective views showing modified examples of the IC tag communication relay sheet 56 shown in FIG. 5. Elements of the configuration that are the same as for FIG. 5 are given the same numerals and description thereof is omitted. The IC tag communication relay sheet 100 of FIG. 8 has two elliptical loop antennas 102 and 104 in the vicinity of the center of the sheet-shaped member 60. Further, the IC tag communication relay sheet 110 of FIG. 9 only has one circular loop antenna 112 in the vicinity of the center of the sheet-shaped member 60. As this shows, the number of antennas for communicating with the IC tags arranged at the antenna section may be set to be an arbitrary number of one, or two or more. It is possible to utilize well-known technology for control in the event that more than one IC tag is taken as a target of communication of one antenna. The number of antennas may be set appropriately taking into consideration antenna sensitivity, switching efficiency, and flexibility with respect to individual boxes of different sizes.

In the above description, the surface area of the sheet-shaped member 60, as shown in FIGS. 4A and 4B, is the same extent as the horizontal surface area closed by the loaded individual boxes. Further, the antenna section provided with the loop antennas is in the vicinity of the center of the sheet-shaped member 60 for communicating with IC tags of individual boxes positioned on the inside at the time of loading on a pallet. However, various modifications are possible in this embodiment.

For example, it is possible to make the sheet member 60 as small as the horizontal surface area taken up by the plural boxes positioned on the inside. In this event, the plate-shaped member 58 may be linked with the sheet-shaped member 60 via a linking member including a cable. Further, in the event that the sheet-shaped member 60 reaches the outer edge of the individual boxes as shown in FIGS. 4A and 4B, it is possible to arrange the antenna section at a peripheral part thereof, i.e. at a position corresponding to the individual boxes on the outside. In this way, good communication is possible with respect to IC tags for individual boxes loaded on the outside.

Further, in the situation shown in FIGS. 4A and 4B, an IC tag communication relay sheet 56 is arranged only between the second and third tiers, but it is also possible to change this arrangement location. Namely, it is possible to provide an IC tag communication relay sheet 56 between the pallet 50 and first tier 51, between the first tier 51 and the second tier 52, between the third tier 54 and fourth tier 55, or between all of these combinations. A combination where an IC tag communication relay sheet 56 is provided between the first tier 51 and the second tier 52, and between the third tier 54 and the fourth tier 55 is given as a first example for reliably ensuring communication with the 2×2 individual boxes on the inside of each tier.

Next, a configuration employing an IC tag communication relay pole as an IC tag communication relay device in place of the IC tag communication relay sheet is described using FIG. 10A to FIG. 15.

Figure 10A:
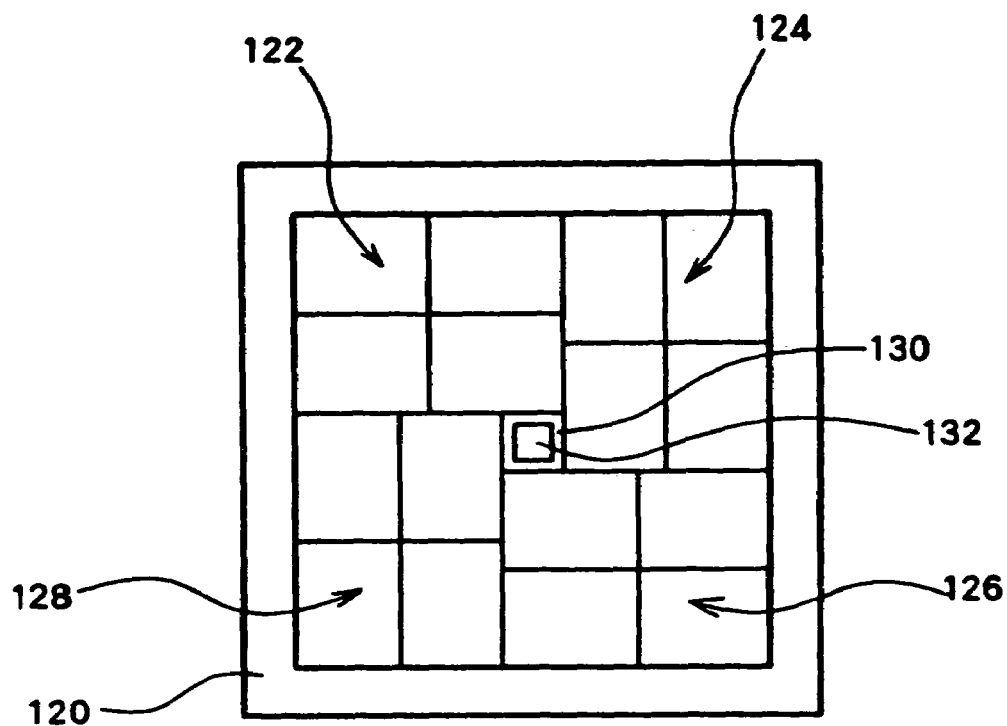
FIG. 10A is a plan view of a loading example employing an IC tag communication relay bar.
Figure 10B:
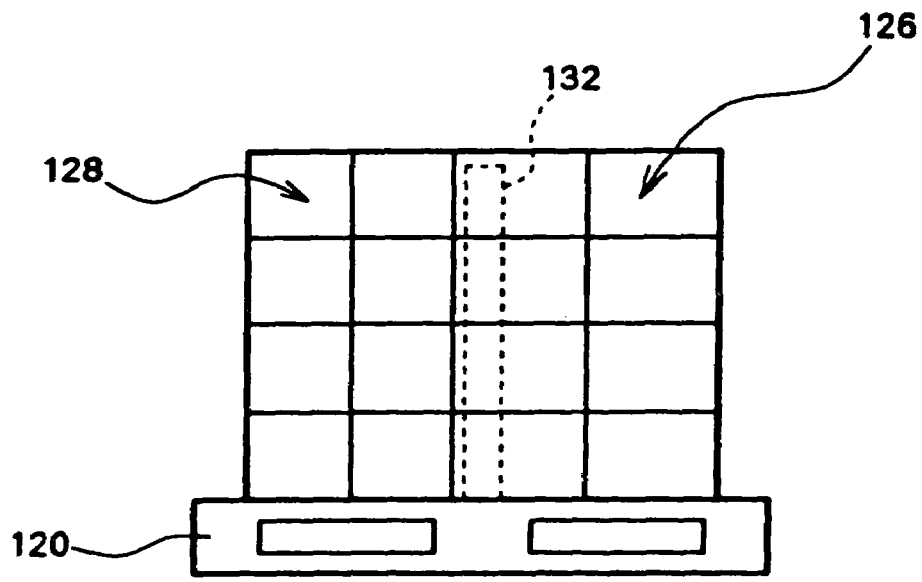
FIG. 10B is a front view of the loading example shown in FIG. 10A.

FIG. 10A is a view from above and FIG. 10B is a front view showing the situation when loading individual boxes on a pallet using a different loading pattern to that of FIGS. 4A and 4B. Here, a total of 64 rectangular boxes slightly elongated in the horizontal direction are loaded on the pallet 120 four in a lateral direction, four in a depth direction, and four high. A method referred to as a square pinwheel course pattern is employed in this loading. Namely, at each tier, as shown in FIG. 10A, four box groups 122, 124, 126, 128 each consisting of 2×2 boxes lined up with their long sides and short sides next to each other are arranged in combinations so that the long sides of neighboring box groups are not next to each other. As a result, a gap 130 is made at the center of the pallet where there are no boxes at all. The boxes are laid on top of each other so as to be arranged in the same way at each tier with the gap 130 constituting a longitudinal hole formed across the height of the four tiers.

Each tier of boxes put 2×2 is loaded along the gap 130 so that surfaces are not exposed to the outside with the exception of the uppermost tier. Communication with the IC tags in these boxes is therefore typically difficult. The IC tag communication relay bar 132 inserted into the gap 130 resolves this problem. The IC tag communication relay bar 132 is formed based on a bar-shaped member with an external shape in the shape of a square column. Further, the lower end of the IC tag communication relay bar 132 reaches the upper surface of the pallet 120 and the upper end is set to a position (for example, on the order of 2 or 3 cm) slightly lower than the upper surface of the boxes of the uppermost tier (fourth tier from the bottom) loaded on the pallet 120.

Because of this, for example, the IC tag communication relay bar 132 is not damaged even if a separate pallet 120 is stacked on the load of the pallet 120. Further, the upper end surface of the IC tag communication relay bar 132 is close to the outer surface of the boxes. This does not obstruct the ability of the hub antenna and reader/writer to communicate with each other as described in the following. In the event that the articles do not overlap at the top, it is possible to effectively increase the reliability of communication by setting the extent to which the upper end surface protrudes from the upper surface of the uppermost tier of the load.

Figure 11:
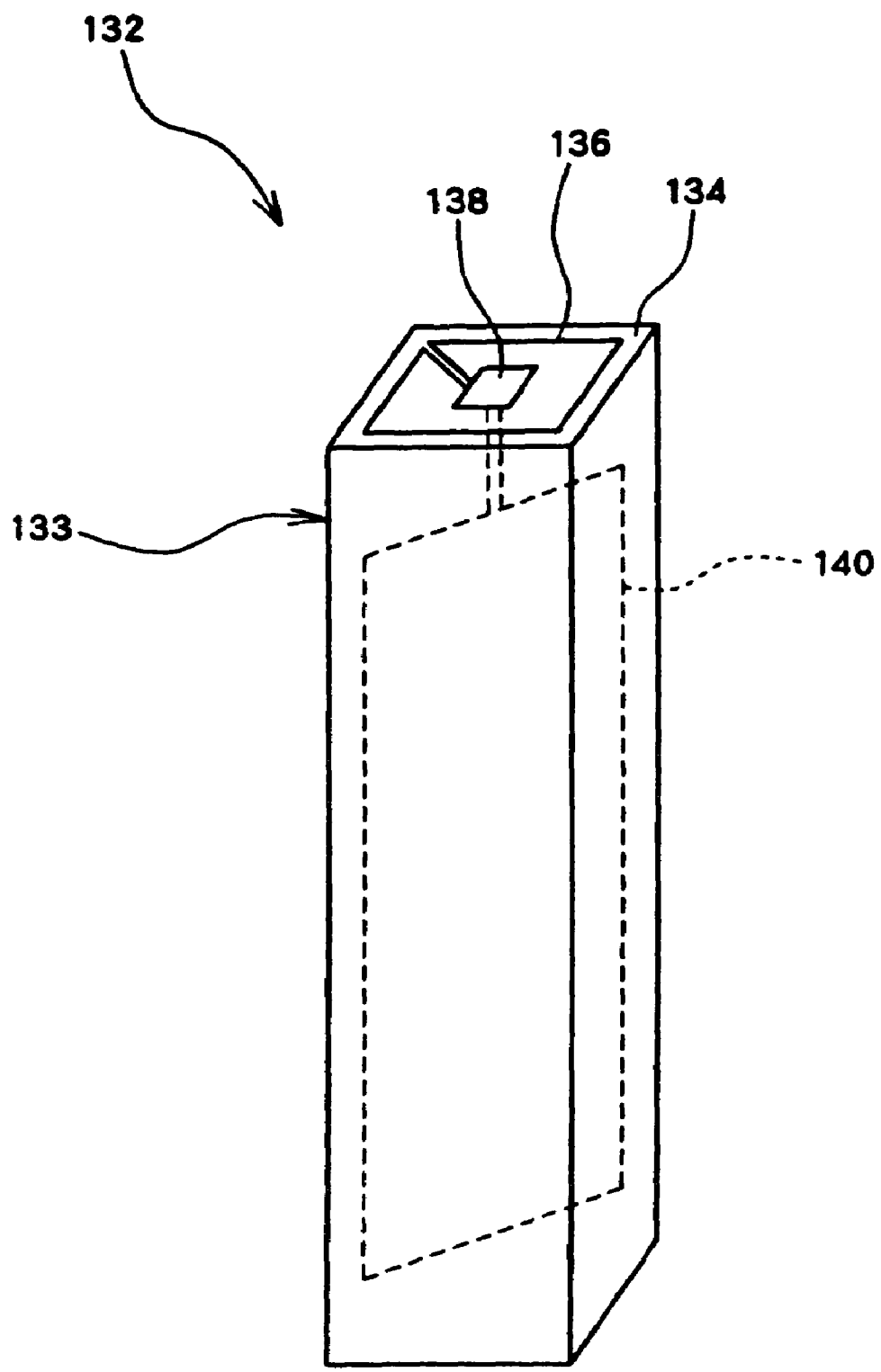
FIG. 11 is a view showing an example of an IC tag communication relay bar.

FIG. 11 is a schematic perspective view of the IC tag communication relay bar 132. The IC tag communication relay bar 132 is made based on a square column-shaped member 133 forming a long bar shape. The square column-shaped member 133 can be formed, for example, from a resin etc. having no conductivity. The inside of the square column-shaped member 133 may also be hollow so as to be lightweight.

A hub antenna 136 forming a loop antenna and a relay 138 connected to this hub antenna 136 are also arranged at the upper end surface 134 of the IC tag communication relay bar 132. The relay 138 is connected to the loop antenna 140 formed within the square column-shaped member 133. This loop antenna 140 is arranged within a surface made by a diagonal of a square of each cross-section of the square column-shaped member 133. Namely, the loop antenna is arranged within a plane extending between diagonally opposed interior corners of the square column-shaped member 133. This is to ensure the same extent of communication function with respect to each surface of the gap 130 as described in the following. Further, the loop antenna 140 is formed so as to be large from close to the upper end of the square column-shaped member 133 to close to the lower end. As a result, it is possible to easily communicate with IC tags of the boxes of each tier.

Figure 12:
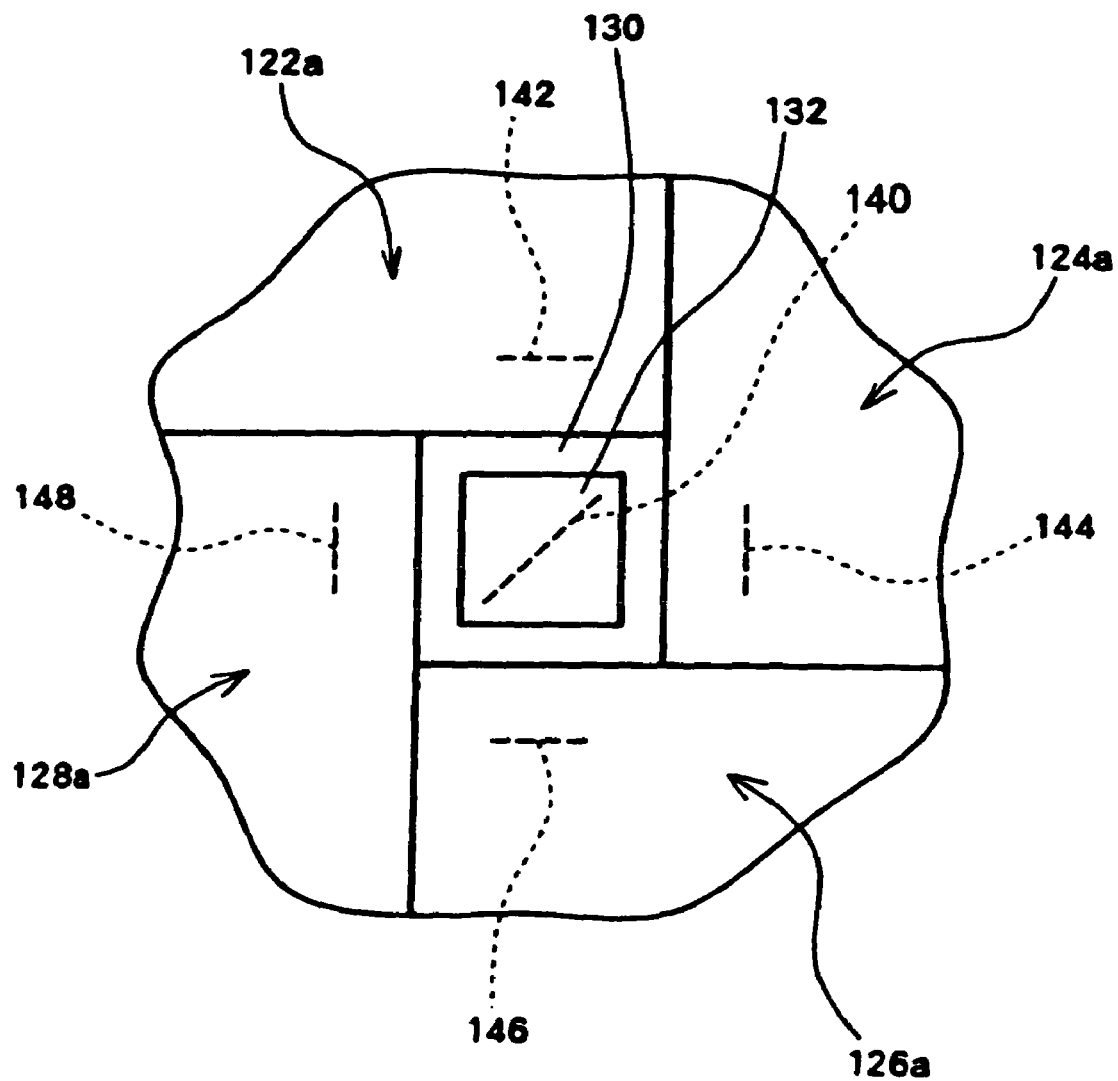
FIG. 12 is an outline view showing a distribution example for an IC tag communication relay bar.

FIG. 12 is a view schematically showing a situation in the vicinity of the IC tag communication bar 132 of FIG. 10A. As described in FIG. 10A, the IC tag communication bar 132 is arranged at the center of the gap 130. The surface of the loop antenna 140 of the IC tag communication relay bar 132 is arranged within a plane extending between diagonally opposed interior corners of the square column-shaped member 133 (of FIG. 11) so that the IC tag communication relay bar 132 is symmetrically arranged inside the gap 130.

The gap 130 forms a rectangular shape with each surface defined by the four boxes 122a, 124a, 126a, 128a. The boxes 122a, 124a, 126a, 128a are boxes contained within the group of boxes 122, 124, 126, 128. IC tags 142, 144, 146, 148 are provided at the packaged process cartridges 10 at each of the boxes 122a, 124a, 126a, 128a. The arrangement direction of the packing direction of the process cartridges 10 and the corresponding boxes 122a, 124a, 126a, 128a is uniform. The reason for this is so that the antenna surfaces of the IC tags 142, 144, 146, 148 face the gap 130. As a result, each antenna surface of the IC tags 142, 144, 146, 148 is arranged so as to make an angle of substantially 45 degrees with the antenna surface of the loop antenna 140. Typically, in the event that the antenna surfaces of the two plane-shaped antennas for transmitting and receiving are not orthogonal, it is possible to ensure an appropriate transmitting and receiving state, and it can be said that setting of states for transmitting and receiving of each antenna of the IC tags 142, 144, 146, 148 and the loop antenna 140 is comparatively good.

The directivity of the antenna is different depending on the shape of the antenna and the frequency used. Further, there are large differences in the ability to communicate that depend on the relative angle of the antenna surfaces and the relative positions (in other words, the projection surface of the facing antennas). Because of this, it is necessary to carefully select the relative positional relationship of the frequency of use and the antennas.

Figure 13:
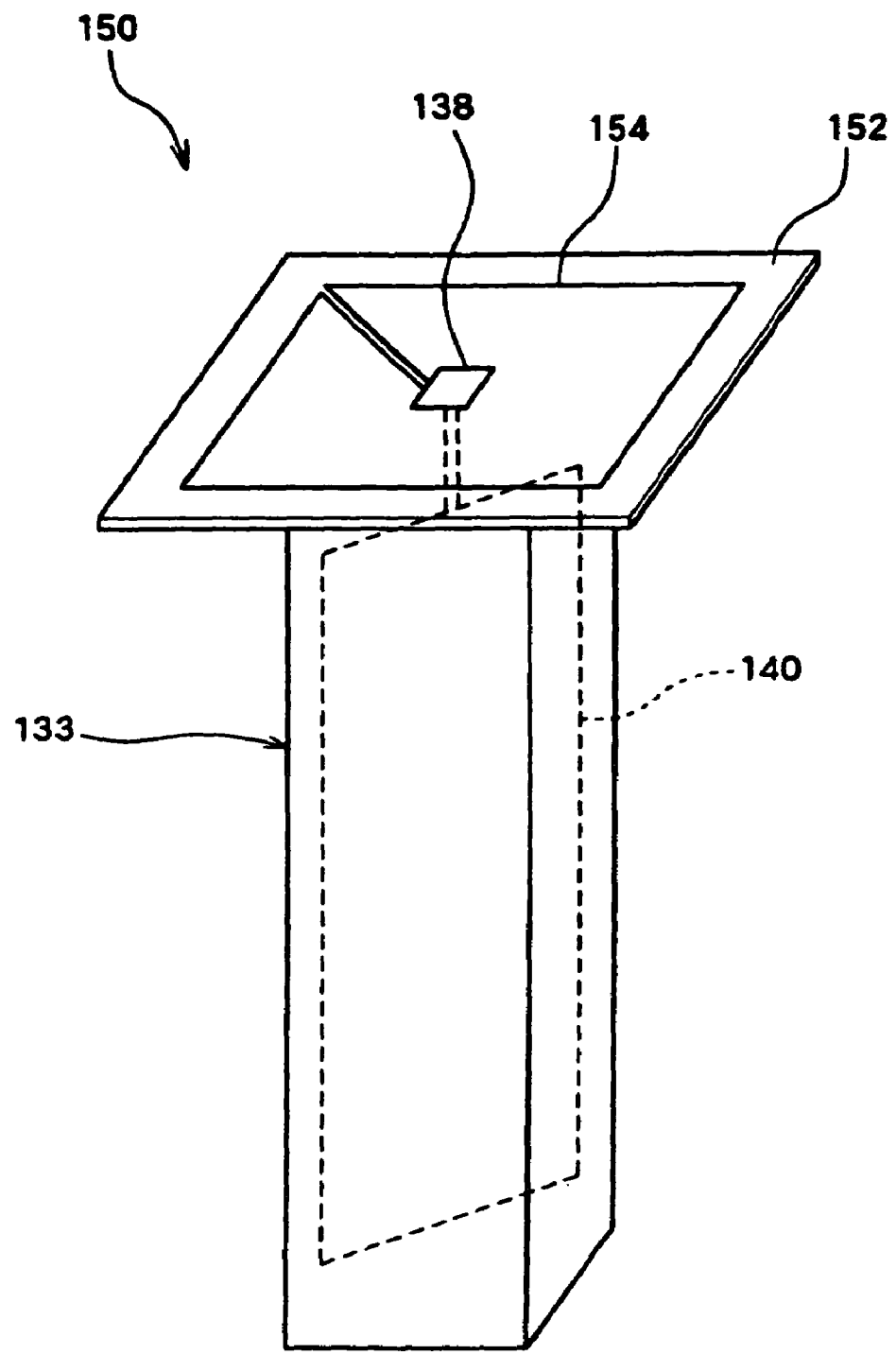
FIG. 13 is a view showing a further example of an IC tag communication relay bar.

FIG. 13 shows an IC tag communication relay bar 150 taken as a modified example of the IC tag communication relay bar 132 shown in FIG. 11. A body section of the IC tag communication relay bar 150 is formed by the same square column-shaped member 133 as the IC tag communication relay bar 132, with the loop antenna 140 being provided within. A characteristic point is that a thin brim 152 having a width broader than the width of the square column-shaped member 133 is provided at the upper end surface of the square column-shaped member 133. A loop antenna-type hub antenna 154 is provided so as to be wound along the vicinity of the edge of the brim 152. The connection of the hub antenna 154 to a relay 138 in the vicinity of the center and the connection of the relay 138 to the loop antenna 140 is the same as for the IC tag communication relay bar 132 of FIG. 11.

As with the IC tag communication relay bar 132, the IC tag communication relay bar 150 is used through insertion into the gap resulting from the square pinwheel course patterning. During this time, the brim 152 is fixed as a result of hooking over the upper end of the gap. Namely, the hub antenna 154 is arranged at the upper end of the gap so that it is possible to ensure a superior communication environment with the reader/writer. It is also effective to provide the hub antenna 154 at the upper surface of the brim 152 from the point of view of ensuring durability in the event that a pallet or boxes or put on the upper part of the brim 152.

Figure 14:
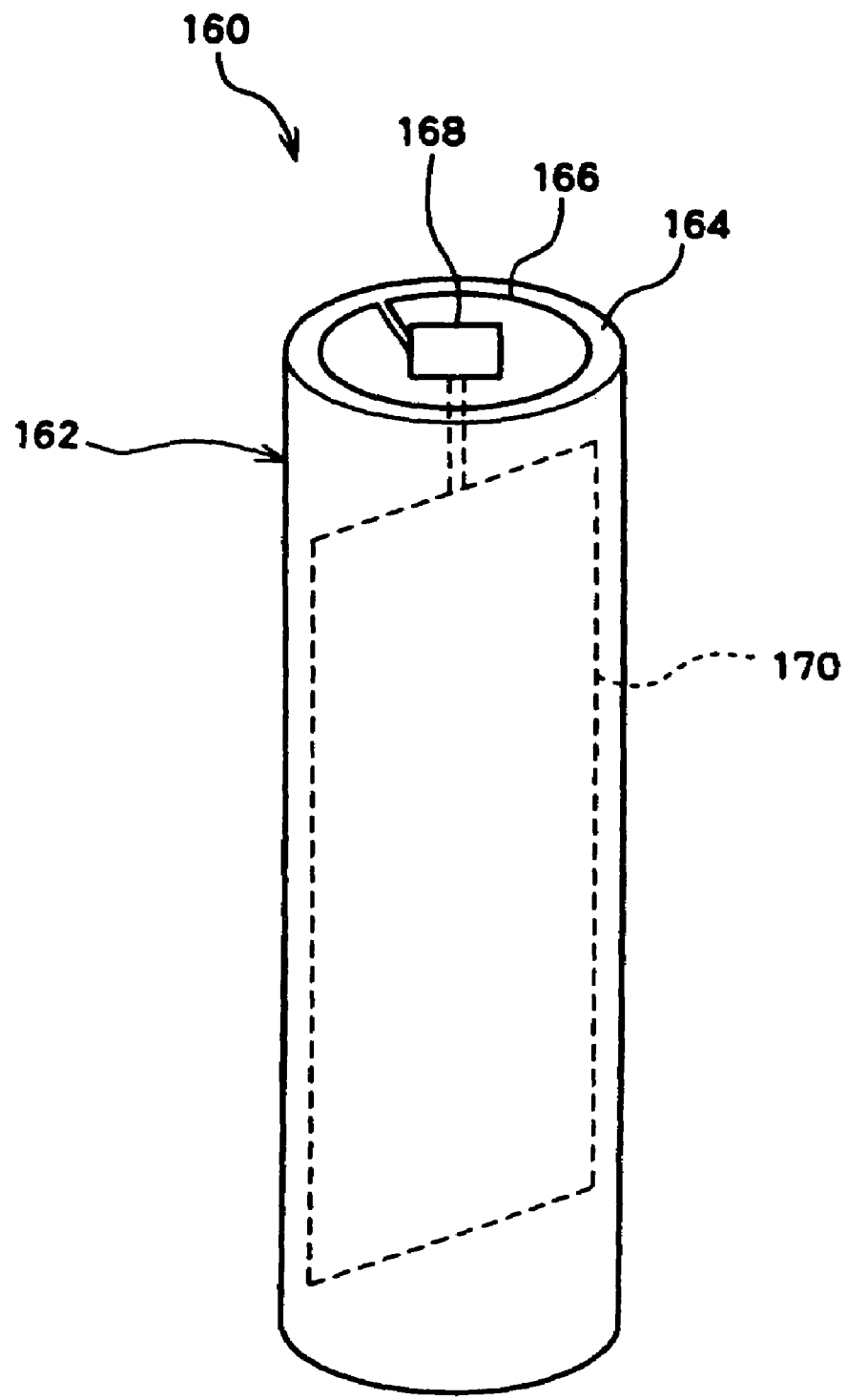
FIG. 14 is a view showing a still further example of an IC tag communication relay bar.

FIG. 14 is a view corresponding to FIG. 11 and illustrates an IC tag communication relay bar 160 taken as a modified example of the IC tag communication relay bar 132 shown in FIG. 11. The IC tag communication relay bar 160 is made based on a cylindrical member 162 forming a long bar shape. A hub antenna 166 constituting a circular loop antenna is arranged at the upper end surface 164 of the cylindrical member 162 and is connected with a relay 168 provided at a central part. The relay 168 connects with a loop antenna 170 provided within the cylindrical member 162. The loop antenna 170 is formed on a surface containing the diameter of the cylindrical member 162.

Figure 15:
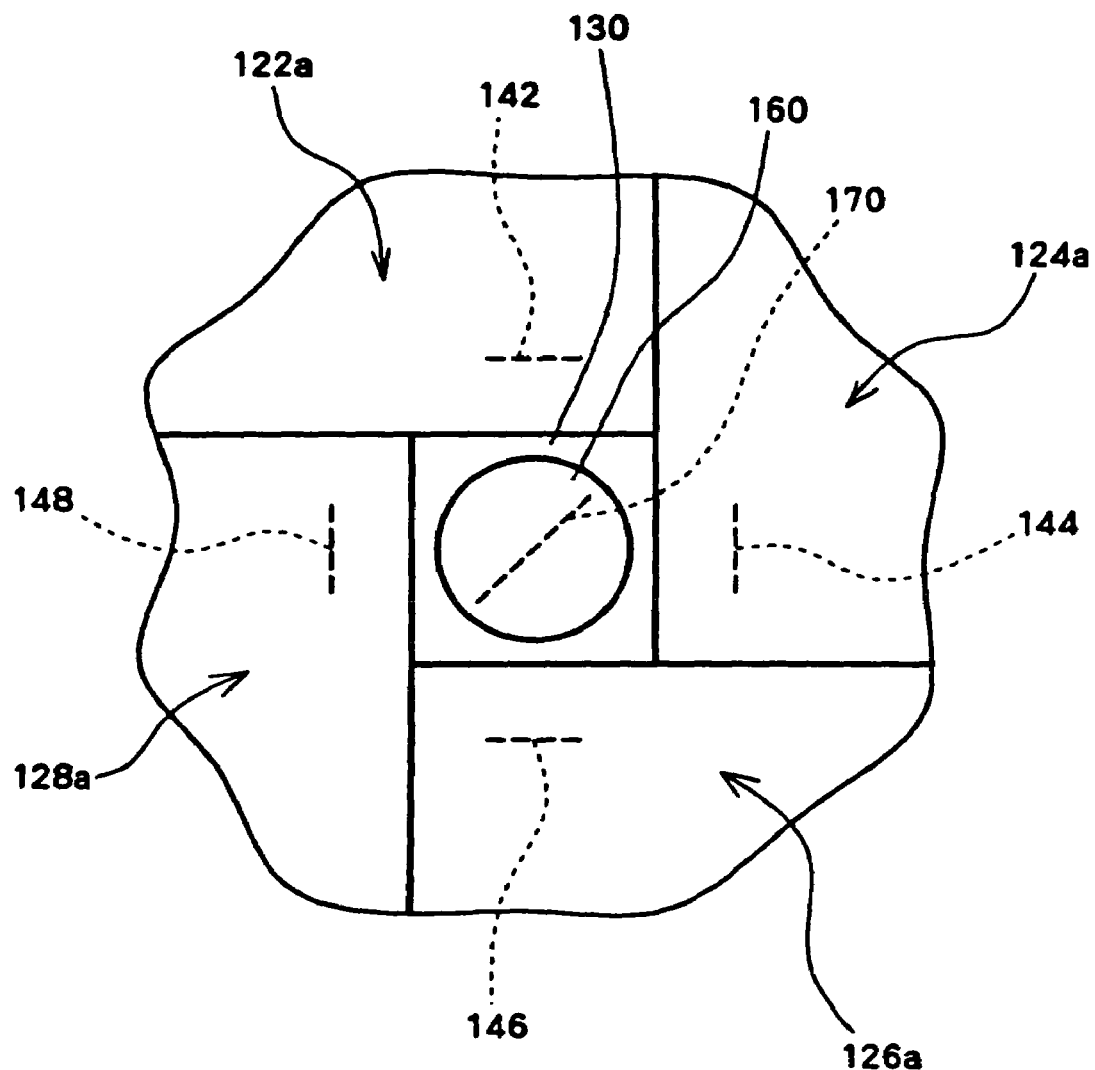
FIG. 15 is an outline view showing a distribution example for an IC tag communication relay bar.

FIG. 15 is a view corresponding to FIG. 12 illustrating insertion to the gap 130 of the IC tag communication relay bar 160. The same members are given the same numerals and description thereof is omitted. The IC tag communication relay bar 160 is fixed in such a manner that the antenna surface of the loop antenna 170 is arranged at the same angle as in the case of FIG. 12. The IC tag communication relay bar 160 is cylindrical and may therefore rotate during transport. In order to prevent this, it is desirable, for example, to insert small pieces having resilience between the IC tag communication relay bar 160 and the surrounding boxes 122a etc. to act as a wedge. It is therefore possible to ensure good transmitting and receiving conditions for between the loop antenna 170 of the IC tag communication relay bar 160 and each of the IC tags 142, 144, 146 and 148. As described above, there may also be cases where there is no hindrance to communication even when the installation direction changes due to the frequency band used.

As described above, an example is shown where the IC tag communication relay bars 132, 150 and 160 are inserted so that the hub antenna serving as input/output section is positioned at the upper side. However, it is also possible to insert the IC tag communication relay bars 132, 150 and 160 so that the hub antenna is on the lower side. In this event, the hub antenna is arranged close to the upper surface of the pallet 120. Typically, the pallet 120 is made of resin or wood etc. and it is therefore possible to ensure sufficient communication conditions between the hub antenna and the reader/writer.

Figure 16:
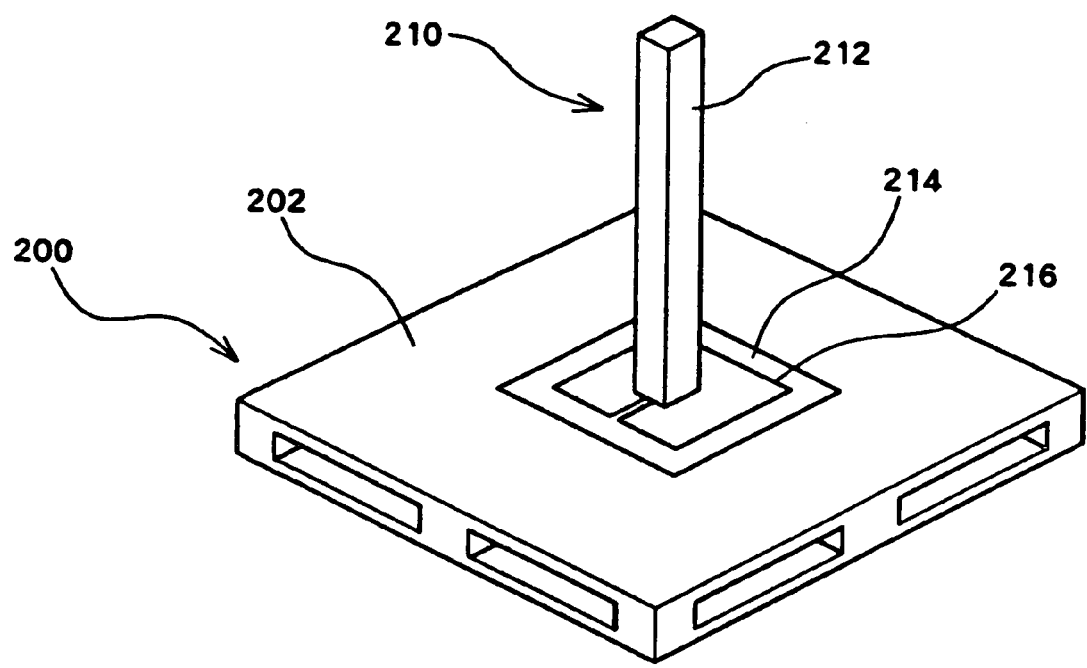
FIG. 16 is a view showing an example of fitting an IC tag communication relay bar to a pallet.

FIG. 16 is a view showing the situation for arranging the IC tag communication relay bar 210 with respect to the upper surface 202 of the pallet 200. The IC tag communication relay bar 210 is configured similarly to the IC tag communication relay bar 150 shown in FIG. 13, and is provided with a square column-shaped member 212 and a rim 214. An antenna for communicating with the IC tags is provided within the square column-shaped member 212. Further, a loop antenna 216 is provided for communicating with the reader/writer. Further, a corresponding relay etc. is provided in the vicinity of the center of the rim 214.

The IC tag communication relay bar 210 is provided on an upper surface 202 of the pallet 200 with the hub antenna 216 taken as an input/output unit i.e. the rim 214 on the lower side. With this arrangement, the rim 214 and the pallet 200 may be fixed by fastening using a bolt etc. or may fit with each other. Alternatively, it is also possible to simply load the IC tag communication relay bar 210 on the pallet 200 so that fixing means can be omitted. In this event, it is possible to stably position the IC tag communication relay bar 210 by loading the load on the rim 214.

Figure 17:
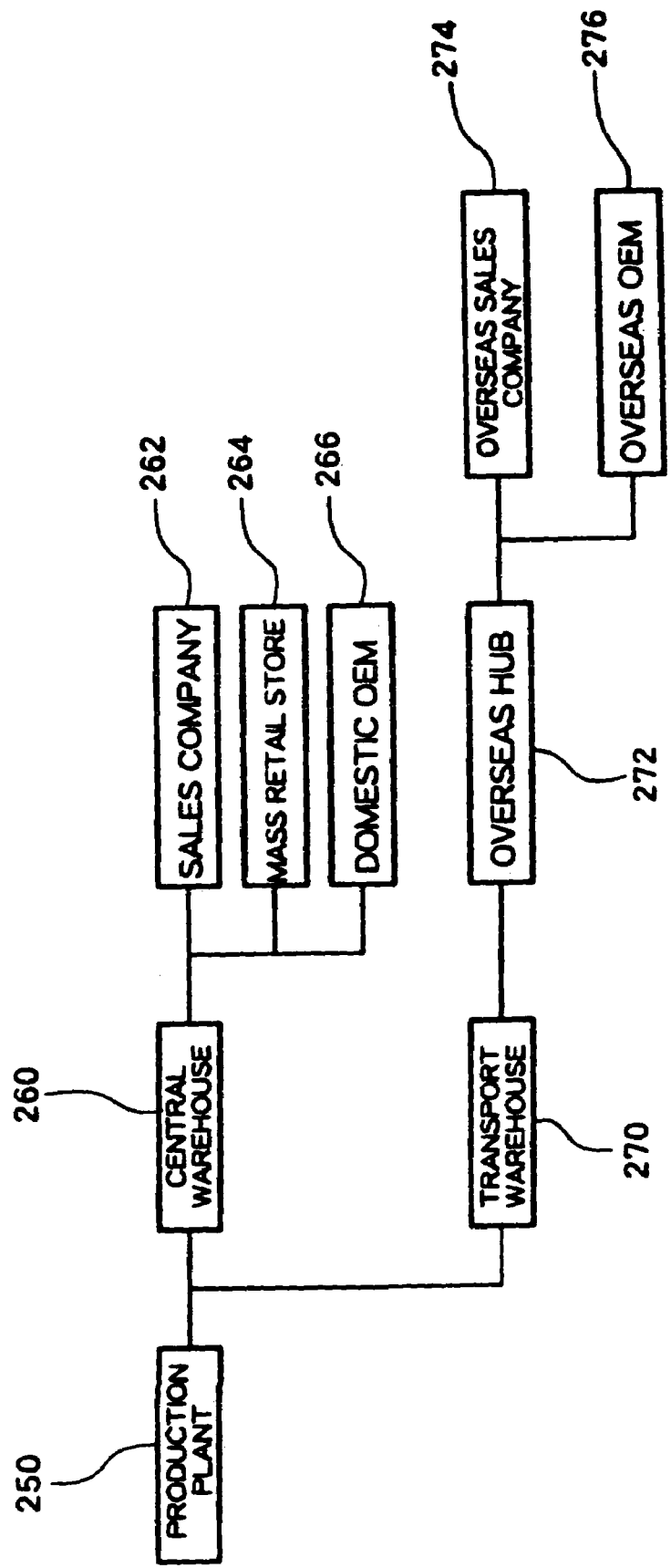
FIG. 17 is a view showing an example of a distribution path.

Continuing on, a description is given of the situation for managing the distribution process using the IC tag communication relay sheet or the IC tag communication relay bar. FIG. 17 shows a distribution process for a process cartridge 10. After being manufactured in a production plant 250, the process cartridges 10 are packed into boxes, loaded on a pallet, and transported to their destination. In the example shown in the drawings, after the portion for domestic shipment is transported to a central warehouse 260 and temporarily kept, the shipment is transported to a sales company 262, mass retail store 264, or domestic original equipment manufacturer 266, etc. Further, after an overseas shipment portion is transported to be temporarily held in a transport warehouse 270, this shipment is shipped to an overseas hub 272 by ship etc. The shipment is then transported from the overseas hub 272 to an overseas sales company 274 or overseas OEM 276.

In the event that an IC tag 28 is arranged at the process cartridges 10, it is possible for this distribution process to be managed by utilizing the IC tags 28. First, at the production plant 250, manufacturing information such as a merchandise code, date of manufacture, and appropriate model (copier, printer) etc. is written to the IC tag at the time of making the process cartridge 10. The process cartridges 10 are then housed in boxes and loaded on the pallet as shown in FIG. 3. The IC tag communication sheet or IC tag communication relay bar are then positioned at the time of loading.

Separate codes are then provided in the merchandise codes stored in the IC tags 28 if the destination (domestic/overseas, own brand/OEM etc.) is different even if the product is the same. Namely, the product code is product information indicating the type of product while at the same time being distribution information expressing a destination. At the transport stage, it is possible to read information of the IC tags 28 with the loaded state of the pallet remaining as is by utilizing the IC tag communication relay sheet or the IC tag communication relay bar and to confirm destinations. The pallet can then be transported to the central warehouse 260 or the transport warehouse 270 based on this information.

The information for the IC tags 28 can also be re-written without having to raise the boxes from the pallet and may remain loaded on the pallet. In the event that, for example, some of the goods for transport to the sales company 262 are switched to being transported to the mass retail store 264, or in the event that an as yet undetermined destination is decided upon, it is possible to give or change a merchandise code of an IC tag from the reader/writer for the process cartridges 10 constituting a target via the IC tag communication relay sheet or IC tag communication relay bar.

In this way, it is possible to access the IC tags without having to raise the temporarily loaded boxes from the pallet, the efficiency of manufacturing and transportation can be improved, and it is also possible to make the management of production, stock, and transport more efficient. As a result, the amount of stock can be reduced, and storage space and the number of storage racks can be reduced through the integration of storage locations. This means that even if sales results fluctuate at each destination, if this is the same product type, then mutual stock flexibility can be achieved, and the risk of stock running out can be reduced. Moreover, if sale of a certain type of merchandise for a certain destination is stopped, this merchandise can be transported to another destination and abandonment can therefore be avoided.

In the above, a description is given taking into consideration applications in process cartridges used in copiers and printers. However, this embodiment can similarly be applied to various goods. By applying this embodiment to goods where there are often cases where conductors are contained, it is possible to bring about superior communication with IC tags fitted to goods and packaging.

The following is a description of various embodiments of the present invention.

In one embodiment of the present invention, an IC tag communication relay device of the present invention is provided with a planar member broadening out into a planar shape, with an antenna being arranged at this planar member. This planar member may be made from a rigid material (material that is difficult to deform) or may be made of a flexible material that is easily deformed. In cases where a stable shape is required, a rigid material can be used, and in cases where fitting with the shape of the surroundings is required at the time of positioning, flexible material can be used. The planar member is typically placed horizontally or vertically in the vicinity of the IC tag it is wished to communicate with. The shape and size of the planar member can be set according to the utilization situation.

In one embodiment, at the IC tag communication relay device of the present invention, the planar member is a flexible sheet member. This sheet member can be made, for example, from a resin having no conductivity. An antenna pattern is then formed at the sheet member. In addition to a position of broadening out in a horizontal or vertical direction, the sheet member can also be arranged so as to bend so as to encompass the goods. The extent of the flexibility of the sheet member can be set appropriately to take into consideration the extent to which fitting to the shape of the surroundings at the time of installation is necessary.

In one embodiment, at the IC tag communication relay device of the present invention, a plate member is connected to an outer edge of the planar member, and the input/output unit is arranged at this plate member. The plate member can be said to be a planer member for which deformation is comparatively difficult. The plate member is connected to an outer edge of the planar member. As a result, in addition to connecting of the plate member and the planar member being kept comparatively strong, the locations where the input/output sections exist are clear.

The IC tag relay device containing the plate member and the planar member is typically sandwiched between small boxes loaded on the planar member, so as to be used with the planar member protruding from the small boxes. At this time, it can be employed to arrange the plate member along the side surfaces of the small boxes etc. so as to not obstruct the periphery during transfer and storage of the plate member. This is so as to bring about fitting so as to fix the plate member to the planar member in advance so that the plate member becomes substantially orthogonal with respect to the planar member. Alternatively, in cases where the planar member is flexible, it is possible to implement a configuration where the plate member hangs down naturally at the side surface of the small boxes etc. by utilizing the weight of the plate member and the flexibility of the planar member.

The arrangement of the input/output unit can be carried out in the same manner as for the others. For example, on the planar member, or in the vicinity of the outer edge of the planar member (fitting to the plate member if necessary). Further, it is also effective for the input/output unit to be formed as a body separate from the planar member, and for both to be connected by a flexible member (for example, a tape-shaped or braided member).

In one embodiment, at the IC tag communication relay device of the present invention, a plurality of antennas are arranged regularly spaced at the antenna section. The number of antennas and their arrangement intervals can be decided by the size and arrangement intervals etc. of the small boxes equipped with IC tags employed together with the planar member. Further, it is also possible to decide based on spacing of the assumed smallest small boxes so as to achieve compatibility with small boxes of various sizes.

In one embodiment of the present invention, the IC tag communication relay device of the present invention is equipped with a rigid long, thin member. This long, thin member is positioned at the antenna section and the input/output unit is arranged at the side of one end of the long, thin member. The long, thin member is formed of a comparatively hard material. This shape maybe bar-shaped, cylindrical, or plate-shaped etc. A shape such as a bar-shape or plate-shape etc. is able to be arranged at a prescribed position in a comparatively stable manner. Further, with planar shapes, positioning is possible without spaces such as planar gaps being substantially occupied. At the time of utilization, this long, thin member is arranged so as to be stood up in a vertical direction. This may also be arranged horizontally or at an incline.

Arranging of the input/output unit to the side of one end of the long, thin member is to bring about a state where a separate member is positioned in the vicinity of one end within the long, thin member, or is connected to the vicinity of one end of the long, thin member. In a latter example, a situation is put forward where a separate member is provided for connecting with a lead line (this may be a member for protecting a lead line as necessary) extending from one end of the long, thin member.

In an embodiment of the present invention, at the IC tag communication relay device of the present invention, the long, thin member has a rectangular cross-section shape, and the antenna is arranged within a plane formed by a diagonal of one square. In one embodiment of an IC tag communication relay device equipped with a long, thin member, it is possible to provide a case of inserting a long, thin member into a gap made as the result of combining a plurality of small boxed equipped with IC tags. In this event, each surface of the square of the thin, long member is typically arranged parallel with each surface of the small boxes. Here, the antenna is arranged within a plane formed by the diagonal of square with respect to an IC of a small box in the four surrounding directions in such a manner that irradiation and receipt of magnetic radiation can be carried out in a balanced manner with a single antenna. This configuration is useful in cases where there is antenna directivity caused by the wavelength of the electromagnetic radiation and the shape of the antenna.

In an embodiment of the present invention, at the IC tag communication relay device of the present invention, the long, thin member is equipped with a cylinder, and the antenna is arranged within a lane containing the central axis of this cylinder. In one embodiment, at the IC tag communication relay device of the present invention, the input/output unit is arranged within one end surface of the long, thin member.

In one embodiment, at the IC tag communication relay device of the present invention, a rim is provided in the vicinity of one end of the long, thin member. In the event, for example, that the rim is at the upper side, and the long, thin member is inserted into a portion of a narrow opening diameter, the rim prevents the IC tag relay device from falling and makes the insertion length uniform. Alternatively, in the event that the IC tag communication relay device is positioned at an appropriate member such as a pallet etc., it is also effective to use the rim as an auxiliary member for installation. In an embodiment of the present invention, at the tag communication relay device of the present invention, the input/output unit is equipped with a hub antenna for inputting and outputting electrical signals to and from the external device via electromagnetic radiation. This hub antenna is positioned at the rim.

In one embodiment of the present invention, at the IC tag communication relay device of the present invention, there is provided a long, thin flexible member equipped with a weight at the side of one end. The input/output unit is arranged at the side of one end of the flexible member and the antenna section is arranged at the flexible member. The flexible member may be thread-shaped or tape-shaped etc. The long, thin flexible member is inserted into a gap extending in a perpendicular direction by utilizing gravitational force acting on the weight, in the same way as for the long, thin member. It is also possible to provide a rim at an appropriate position is the same way as for the long, thin member. In the event that the input/output unit is fitted on the side of a weight, the input/output unit itself may play the role of the weight.

In an embodiment of the present invention, at the tag communication relay device of the present invention, the input/output unit is equipped with a hub antenna for inputting and outputting electrical signals to and from the external device via electromagnetic radiation. Namely, the hub antenna is provided as an antenna for carrying out inputting and outputting of signals to and from an external device using a wireless method. The shape of the hub antenna can be appropriately set to take into consideration the utilized frequency band and installation space (plane or solid), etc.

In an embodiment of the present invention, at the tag communication relay device of the present invention, the input/output unit is equipped with a terminal for enabling hardwired connection with the external device. Namely, a terminal making contact with the external device is provided for inputting and outputting signals to and from the external device using a hard-wired method. The terminal is typically in the form of a connector shape. Namely, the terminal is of a shape capable of enabling temporary fixing in a straightforward manner through fitting with a terminal of the corresponding external device.

In an embodiment of the present invention, at the tag communication relay device of the present invention, an amplifier for amplifying the electrical signal is provided on the lead line. Typically, the amplifier is equipped with an internal battery acting as a driving source for performing driving. It is also possible to adopt a configuration where electrical power provided in the form of electromagnetic radiation etc. from an external device is stored in a capacitor and taken as a source of electrical power. There is no particular preference for the arrangement of the amplifier in the event that there is irradiation of radiation at the same time from plural antennas at the antenna section and in the case that it is necessary to provide corresponding electromagnetic energy when the IC tag employs a passive system.

In an embodiment of the present invention, at the IC tag communication relay device of the present invention, the antenna section is provided with a plurality of antennas, and a switching circuit for switching antennas connected to the external device is provided on the lead line. When electromagnetic radiation is irradiated from plural antennas at the same time, there is a fear of interference from electromagnetic radiation. Further, when electromagnetic radiation is received from plural antennas at the same time, there is also the fear that analysis will become complex due to superposition of the signals. Switching of antennas to be targeted for connection is then carried out by the switching circuit. The switching may be carried out automatically in accordance with a preset procedure or may be carried out based on instructions from an external device.

The IC tag communication relay method of the present invention comprises a loading step of loading small boxes of the same shape equipped with IC tags onto a pallet to two or more tiers with one tier being at least 3×3 boxes with a planar member of an IC tag communication relay device being arranged on a lower surface or upper surface of a small boxes with no outwardly visible surfaces at the time of completion of loading and performing a process for positioning an input/output unit at a position visible from outside at the time of completion of loading, and a communication step of connecting to the input/output unit using the external device and communicating with IC tags provided at the small boxes that are not externally visible.

According to this configuration, in the event that plural loads containing IC tags are loaded on a pallet, it is possible to improve the ease with which IC tags on the inside of the pallet can be accessed. This configuration is particularly beneficial in cases where the goods within the small boxes are mainly conducting. In cases where the input/output unit is accessed using electromagnetic radiation, it is not essential to always position the input/output unit so as to face outwards at the time of completion of loading. Namely, it is sufficient for positioning to be such that communication with an external device is possible, and it is therefore possible to make installation of the IC tag communication relay device straightforward. On the other hand, in cases where the input/output unit is made to face outside, the user can easily confirm the position of the input/output unit or the presence of the IC tag communication device.

Alternatively, an IC tag communication relay method of the present invention comprises a loading step of loading small boxes of the same shape equipped with IC tags in at least two tiers on a pallet with one tier having at least 3×3 boxes using a pinwheel course pattern, providing a gap at the periphery of small boxes not having surfaces exposed to the outside at the time of completion of loading, and with each tier being stacked up with the small boxes having the same positional relationship, an insertion step of inserting a long, thin member of the IC tag communication relay device or a flexible member of the IC tag communication relay device into the gap from above, and a communication step of connecting a signal to the input/output unit using the external device, and communicating with IC tags provided at small boxes without surfaces exposed to the outside.

In an embodiment of the present invention, in the insertion step of the IC tag communication relay method of the present invention, the long, thin member or the flexible member is inserted from the upper side from where the input/output unit is arranged. It is anticipated that communication with external devices will be easier when the input/output unit is arranged on the upper side. With the insertion step of the IC tag communication relay method of the present invention, the long, thin member or the flexible member may also inserted from the lower side from where the input/output unit is arranged. This is because it is anticipated that it will be possible to ensure sufficient communication performance even when the input/output unit is arranged on the lower side in the case of the configuration where the input/output unit is equipped with a hub antenna.

Alternatively, the IC tag communication relay method of the present invention may comprise an installation step of installing a long, thin member of an IC tag communication relay device so as to stand in a vertical direction on the upper surface of a pallet, a loading step of loading small boxes of the same size equipped with IC tags on the pallet in tiers of at least 3×3 boxes to a height of at least two tiers so that small boxes with no outer surfaces exposed are in close contact with the long, thin member so as to be in a pinwheel course pattern when loading is complete, and a communication step of connecting to the input/output unit using the external device and communicating with IC tags provided at the small boxes that are not externally visible.

In an embodiment of the present invention, in the installation step of the IC tag communication relay method of the present invention, the long, thin member is installed from the upper side from where the input/output unit is arranged. Alternatively, in the installation step of the IC tag communication relay method of the present invention, the long, thin member may be installed from the lower side from where the input/output unit is arranged.

In an embodiment of the present invention, the relative positional relationship of the IC tags and the IC tag relay device antenna are set in such a manner that IC tags provided at small boxes with no outer surfaces exposed to the outside and the antenna of the IC tag relay device are substantially parallel. For example, in cases where a frequency band in the order of 10 MHz (13.56 MHz etc.) is utilized between the IC tag and the antenna of the IC tag communication device, this configuration is effective in bringing about superior transmission and receipt of signals.

The disclosure of Japanese Patent Application No. 2004-162298 filed on May 31, 2004 including specification, claims, drawings and abstract is incorporated herein by reference in its entirety.

What is claimed is:

1. An IC tag communication relay device comprising:
an antenna section equipped with one or more antennas for transmitting and receiving electromagnetic radiation to and from IC tags;

lead lines connected to each antenna for transmitting electrical signals corresponding to the transmitted and received electromagnetic radiation;

an input/output unit arranged outside of the antenna section and connected to the lead lines for inputting and outputting electrical signals to and from an external device through electromagnetic radiation, wherein the IC tag communication relay device is provided separately from the external device and the IC tags and relays communication between the external device and the IC tags;

a planar member, wherein the antenna section is positioned at this planar member; and a plate-shaped member connected to the outer edge of the planar member, wherein the input/output unit is positioned at this plate-shaped member.

2. The IC tag communication relay device as disclosed in claim 1, wherein the planar member is a flexible sheet-shaped member.

3. The IC tag communication relay device as disclosed in claim 1, wherein a plurality of antennas are arranged at regular intervals at the planar member.

4. The IC tag communication relay device as disclosed in claim 1, wherein the input/output unit comprises a hub antenna for inputting and outputting electrical signals via electromagnetic radiation.

5. The IC tag communication relay device as disclosed in claim 1, wherein an amplifier for amplifying the electrical signals is provided for the lead lines.

6. The IC tag communication relay device as disclosed in claim 1, wherein the antenna section comprises a plurality of antennas, and a switching circuit for switching antennas which receive the electrical signals corresponding to the electromagnetic radiation received by the input/output unit is provided at the lead lines.

7. An IC tag communication relay method comprising:

a loading step of loading small boxes of the same shape equipped with IC tags onto a pallet in two or more tiers with one tier being at least 3×3 boxes, arranging the planar member of the IC tag communication relay device as disclosed in claim 1 at the lower surface or upper surface of small boxes having no surfaces exposed to the outside at the end of loading, and arranging the input/output unit at a position facing the outside at the time of completion of loading; and a communication step of connecting to the input/output unit using the external device and communicating with IC tags provided at the small boxes that are not externally visible.

8. An IC tag communication relay device comprising:

an antenna section equipped with one or more antennas for transmitting and receiving electromagnetic radiation to and from IC tags;

lead lines connected to each antenna for transmitting electrical signals corresponding to the transmitted and received electromagnetic radiation;

an input/output unit arranged outside of the antenna section and connected to the lead lines for inputting and outputting electrical signals to and from an external device through electromagnetic radiation, wherein the IC tag communication relay device is provided separately from the external device and the IC tags and relays communication between the external device and the IC tags; and a rigid long, thin member, wherein the antenna section is arranged at the long, thin member, and the input/output unit is positioned at one end of the long, thin member.

9. The IC tag communication relay device as disclosed in claim 8, wherein the long, thin member has a square cross-section, and the antennas are positioned within a plane formed by a diagonal of the square.

10. The IC tag communication relay device as disclosed in claim 8, wherein the long, thin member is cylindrical, and the antenna section is arranged within a plane including the central axis of rotation of the cylinder.

11. The IC tag communication relay device as disclosed in claim 8, wherein the input/output unit is positioned within an end surface of the long, thin member.

12. The IC tag communication relay device as disclosed in claim 8, wherein a rim is provided in the vicinity of one end of the long, thin member.

13. The IC tag communication relay device as disclosed in claim 12, wherein the input/output unit comprises a hub antenna for inputting and outputting electrical signals via electromagnetic radiation, and the hub antenna is positioned at the rim.

14. The IC tag communication relay device as disclosed in claim 8, wherein the input/output unit comprises a hub antenna for inputting and outputting electrical signals via electromagnetic radiation.

15. The IC tag communication relay device as disclosed in claim 8, wherein an amplifier for amplifying the electrical signals is provided for the lead lines.

16. The IC tag communication relay device as disclosed in claim 8, wherein the antenna section comprises a plurality of antennas, and a switching circuit for switching antennas which receive the electrical signals corresponding to the electromagnetic radiation received by the input/output unit is provided at the lead lines.

17. An IC tag communication relay device comprising:

an antenna section equipped with one or more antennas for transmitting and receiving electromagnetic radiation to and from IC tags;

lead lines connected to each antenna for transmitting electrical signals corresponding to the transmitted and received electromagnetic radiation;

an input/output unit arranged outside of the antenna section and connected to the lead lines for inputting and outputting electrical signals to and from an external device through electromagnetic radiation, wherein the IC tag communication relay device is provided separately from the external device and the IC tags and relays communication between the external device and the IC tags; and further comprising a long, thin flexible member equipped with a weight at the side of one end, wherein the input/output unit is positioned at the side of either end of the flexible member, and the antenna section is positioned at the flexible member.

18. An IC tag communication relay method comprising:

a loading step of loading small boxes of the same shape equipped with IC tags in at least two tiers on a pallet with one tier having at least 3×3 boxes using a pinwheel course pattern, providing a gap at the periphery of small boxes not having surfaces exposed to the outside at the time of completion of loading, and with each tier being stacked up with the small boxes having the same positional relationship;

an insertion step of inserting a rigid long, thin member of an IC tag communication relay device into the gap from above, the IC tag communication relay device comprising:

an antenna section equipped with one or more antennas for transmitting and receiving electromagnetic radiation to and from IC tags;

lead lines connected to each antenna for transmitting electrical signals corresponding to the transmitted and received electromagnetic radiation;

an input/output unit arranged outside of the antenna section and connected to the lead lines for inputting and outputting electrical signals to and from an external device through electromagnetic radiation, wherein the IC tag communication relay device is provided separately from the external device and the IC tags and relays communication between the external device and the IC tags; and the rigid long, thin member, wherein the antenna section is arranged at the long, thin member, and the input/output unit is positioned at one end of the long, thin member; and a communication step of connecting to the input/output unit using the external device and communicating with IC tags provided at the small boxes that are not externally visible.

19. An IC tag communication relay method comprising:

a loading step of loading small boxes of the same shape equipped with IC tags in at least two tiers on a pallet with one tier having at least 3×3 boxes using a pinwheel course pattern, providing a gap at the periphery of small boxes not having surfaces exposed to the outside at the time of completion of loading, and with each tier being stacked up with the small boxes having the same positional relationship;

an insertion step of inserting the flexible member of an IC tag communication relay device into the gap from above, the IC tag communication relay device comprising:

an antenna section equipped with one or more antennas for transmitting and receiving electromagnetic radiation to and from IC tags;

lead lines connected to each antenna for transmitting electrical signals corresponding to the transmitted and received electromagnetic radiation;

an input/output unit arranged outside of the antenna section and connected to the lead lines for inputting and outputting electrical signals to and from an external device through electromagnetic radiation, wherein the IC tag communication relay device is provided separately from the external device and the IC tags and relays communication between the external device and the IC tags; and a long, thin flexible member equipped with a weight at the side of one end, wherein the input/output unit is positioned at the side of either end of the flexible member, and the antenna section is positioned at the flexible member; and a communication step of connecting to the input/output unit using the external device and communicating with IC tags provided at the small boxes that are not externally visible.

20. An IC tag communication relay method comprising:

an installation step of installing a rigid long, thin member of an IC tag communication relay device upright in a vertical direction at the upper surface of a pallet, the IC tag communication relay device comprising:

an antenna section equipped with one or more antennas for transmitting and receiving electromagnetic radiation to and from IC tags;

lead lines connected to each antenna for transmitting electrical signals corresponding to the transmitted and received electromagnetic radiation;

an input/output unit arranged outside of the antenna section and connected to the lead lines for inputting and outputting electrical signals to and from an external device through electromagnetic radiation, wherein the IC tag communication relay device is provided separately from the external device and the IC tags and relays communication between the external device and the IC tags; and the rigid long, thin member, wherein the antenna section is arranged at the long, thin member, and the input/output unit is positioned at one end of the long, thin member;

a loading step of loading small boxes of the same size equipped with IC tags on the pallet in tiers of at least 3×3 boxes to a height of at least two tiers so that small boxes with no outer surfaces exposed are in close contact with the long, thin member so as to be in a pinwheel course pattern when loading is complete; and a communication step of connecting to the input/output unit using the external device and communicating with IC tags provided at the small boxes that are not externally visible.

\* \* \* \* \*